A. PRIBIL.
LUBRICATOR WITH BALL CLOSURE.
APPLICATION FILED DEC. 9, 1908.

992,519.

Patented May 16, 1911.

WITNESSES:
Fred White
René Bruine

INVENTOR:
Adolphe Pribil,
By Attorneys,

UNITED STATES PATENT OFFICE.

ADOLPHE PRIBIL, OF MARSEILLE, FRANCE.

LUBRICATOR WITH BALL-CLOSURE.

992,519.          Specification of Letters Patent.   Patented May 16, 1911.

Application filed December 9, 1908. Serial No. 466,630.

*To all whom it may concern:*

Be it known that I, ADOLPHE PRIBIL, a citizen of the French Republic, residing at 55 Rue Paradis, Marseille, France, have invented certain new and useful Improvements in Lubricators with Ball-Closures, of which the following is a specification.

The present invention relates to lubricating devices, and especially to lubricators having ball closures. In this class of lubricators an oil duct is provided upon which rests a ball designed to permit the passage of oil through the duct when the ball is shaken in use. In devices of this kind as heretofore made the top of the duct has been so constructed that a ball rested either in a seat so that there was considerable surface contact between the parts; or the formation has been so close to this construction that the oil causes an adhesion between the ball and its socket or seat. Even though the ball actually rests upon the top of the duct so that there is only a circle of contact, there is apt to be considerable adhesion where the upper wall of the duct or socket forms with a tangent struck from the ball at the circle of contact an angle which is very acute.

According to the present invention the top of the duct is so constructed that the angle just referred to is very large. In other words, the top of the seat is conically raised so that it forms an angle with the ball which is so large as to avoid the adhesive action of the oil. According to another feature of the invention, means are provided for so limiting the ball in its play that its center of gravity remains always above the duct. I have also discovered that very much improved results can be obtained if the diameters of the ball and duct are in a certain definite proportion. The ball must be lifted from its lowest position in order to permit the oil to enter the duct. The greater the lift the greater the lubricating effect with a given diameter of ball. Naturally the degree of lifting differs with the relative diameters of the duct and ball.

Figure 1:
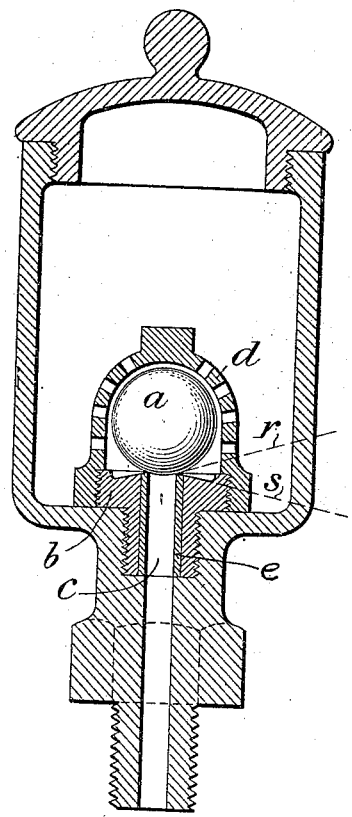
Figure 2:
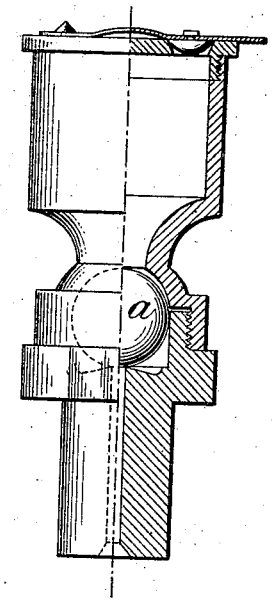

In the accompanying drawings wherein 1 have illustrated one form of the invention, Figure 1 is a vertical section showing the invention as applied to an ordinary oil reservoir and Fig. 2 is an elevation partly in section of the preferred form.

Referring to the drawings, the ball $a$ which is preferably of hardened steel rests on a seat member $b$. The top of the latter is raised at an oblique angle toward the center. It has a passage $c$ forming the oil duct. It will be seen that by this construction the surface of the ball is separated widely from the seat member, except along the narrow edge of the seat. In other words a tangent $r$ struck from the ball forms a large angle with the sides $s$ of the seat member, so that adhesion due to the oil between the ball and the socket is avoided. By this means the lubricating device becomes much more sensitive, and works more easily.

The force required to raise the ball is obviously less the smaller the duct upon which the ball rests. Hence other things being equal, the smaller the duct the more sensitive lubrication would be obtained. A limit is soon reached however, since if the diameter of the duct is made too small there is considerable danger of the ball leaving its seat too easily, so that too much oil is fed through the duct. To counteract this a heavier ball must be used in order to obtain the best results. Extended experiments have shown that a ball of 17 to 21 mm. diameter and an oil duct of 1.7 to 4.8 mm. in diameter yield the best results. The ball may preferably have a diameter of 19 mm.

In order to afford a certainty of closing from all positions to which the ball may be moved, means are provided such as the hood $d$ for so limiting the movement of the balls as to prevent the center of gravity of the ball falling outside of the area of the duct. The hood may be formed with a series of perforations as shown in Fig. 1, or may have a central perforation, as shown in Fig. 2. In consequence of this arrangement the ball is continuously raised and lowered, due to the shaking action of the vehicle or bearing. I have found in practice that it also performs an unexpected result in the nature of a pumping action. On account of its weight it presses the oil into the duct so that if at the lower end of the oil duct there is arranged a small manometric glass tube, it is found that the oil is higher therein while the engine is working and lower when the engine is stationary. This pressure induced by the ball is of importance since in many instances parts which are to be lubricated rest against one another with such pressure as to require a corresponding pressure of the oil to force its way between the parts. Since the pumping action of the ball is not dependent upon the height of the oil